US012149796B2

United States Patent
Yang et al.

(10) Patent No.: US 12,149,796 B2
(45) Date of Patent: Nov. 19, 2024

(54) SMART CONTENT SEARCH FROM AUDIO/VIDEO CAPTURES WHILE WATCHING TV CONTENT ITSELF

(71) Applicant: DISH Technologies L.L.C., Englewood, CO (US)

(72) Inventors: Yunfeng Yang, Aurora, CO (US); John D Barbieri, Littleton, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 36 days.

(21) Appl. No.: 18/091,210

(22) Filed: Dec. 29, 2022

(65) Prior Publication Data

US 2024/0223861 A1 Jul. 4, 2024

(51) Int. Cl.
*H04N 21/4722* (2011.01)
*G06F 3/16* (2006.01)
*G06F 16/432* (2019.01)
*G06F 16/483* (2019.01)

(52) U.S. Cl.
CPC ......... *H04N 21/4722* (2013.01); *G06F 3/167* (2013.01); *G06F 16/434* (2019.01); *G06F 16/483* (2019.01)

(58) Field of Classification Search
CPC ... H04N 21/4722; G06F 3/167; G06F 16/434; G06F 16/483
See application file for complete search history.

(56) References Cited

U.S. PATENT DOCUMENTS

| 2003/0051252 | A1* | 3/2003 | Miyaoku | .......... H04N 21/42202 348/E7.071 |
| 2009/0049031 | A1* | 2/2009 | Hepburn | ............. G06F 16/2425 707/999.005 |
| 2021/0089268 | A1* | 3/2021 | Ahamed | ............. G06F 3/04817 |

* cited by examiner

*Primary Examiner* — Adil Ocak
(74) *Attorney, Agent, or Firm* — Seed IP Law Group LLP

(57) ABSTRACT

According to principles of the disclosure, additional information about a subject of interest appearing in an audio/video program is conveyed to a user. The user, interacting with various features of a control device, provides one or more commands to a computing device acting as a source for audio/video content. The one or more command is interpreted by the computing device to identify the user's subject of interest. Once the user's subject of interest is determined, an appropriate database is searched for additional information about the subject of interest. Search results are processed and conveyed to the user through a display, speaker, or other appropriate means.

20 Claims, 8 Drawing Sheets

SMART CONTENT SEARCH FROM AUDIO/VIDEO CAPTURES WHILE WATCHING TV CONTENT ITSELF

BACKGROUND

Technical Field

This disclosure is in the general field of allowing a user viewing an audio/video program to search a database for additional information about subjects of interest in the audio/video program using a control device.

Description of the Related Art

When an audio/video program is being displayed, a user may be interested in obtaining more information about subjects appearing in the audio/video program. For example, a user may wish to learn where a particular scene was shot, the name of an actor, or the make and model of a vehicle appearing on-screen. Manually searching for this information using a smartphone or computer, for instance, may be cumbersome and distracting. It is desirable to enable the user to easily obtain additional information about the audio/video program they are viewing.

BRIEF SUMMARY

According to principles of the disclosure, additional information about a subject of interest appearing in an audio/video program is conveyed to a user. The user, interacting with one or more features of a control device, provides one or more commands to a computing device acting as a source for audio/video content. The one or more commands is interpreted by the computing device to identify the user's subject of interest. Once the user's subject of interest is determined, an appropriate database is searched for additional information about the subject of interest. Search results are processed and conveyed to the user through a display, speaker, or other appropriate means.

According to some embodiments, a method for conveying additional information of an audio/video program begins with outputting, from a memory of a set top box, an audio component of a program data configured to be received by a speaker and a video component of the program data configured to be received by a display. The audio and video components of the audio/video program may in some instances be synchronized on a same data stream. Then, the set-top box receives a command from a control device. In response to the command, the set-top box identifies a subject of the audio/video program that corresponds to the command. The set-top box then conducts a search for information about the identified subject in a database and receives information about the subject from the conducted search. It then, based on the information searched and the identity of a user, selects results from the search likely to be relevant to the user. The selected results are then conveyed to the user.

In some embodiments, the search is internet-enabled. The search may also, in some instances, be performed in a memory of the set-top box. The subject of the search may be an audio component or a video component of the audio/video program. A representation of the selected results may be conveyed to the user visually using a display or aurally using a speaker in various embodiments. In some embodiments, the set-top box pauses the audio/video program in response to the command until the search results are conveyed to the user. Program data having information about the search results and the command may in some instances be saved to the set-top box. In some embodiments, program data having information about the search results is saved in the memory, and while the same audio/video program is being subsequently displayed, a visual representation of the program data is output by the display.

According to some embodiments, a system configured to convey additional information about a subject of an audio/video program includes a display configured to output a video component of the audio/video program and a speaker configured to output the audio components of the audio/video program. It also includes a set-top box configured to output the video component to the display and the audio component to the speaker. A control device is configured to receive input from a user and communicate with the set-top box. The set-top box includes a processor configured to receive a command from the control device and identify a subject of the audio/video program that corresponds to the command. It is further configured to perform a search for information about the subject, obtain search results about the subject based on the search, and convey the search results to the user.

In some instances, the processor is further configured to send information about the command to a remote server. It may also be configured to send information about the search results to the remote server. The subject may be an audio component or a video component of the audio/video program. The audio component and video component are in some instances synchronized on a same data stream.

The search results may be conveyed visually using a display or aurally using a speaker.

According to some embodiments, a set-top box system configured to convey additional information about a subject of an audio/video program includes a memory coupled to a processor and a connection to a communication system. It also includes a processor configured to receive a command from a control device operated by a user while an audio/video program is being displayed to the user. Then, the processor computes an embedding based on the command and the audio/video program. Next, the embedding is compared to historical embeddings paired with historical subjects. Historical subjects are selected based on the comparison. Then, a candidate subject is determined based on the historical subjects and a search for information about the candidate subject is performed and search results are obtained. The search results are then conveyed to the user.

DETAILED DESCRIPTION

Figure 1A:
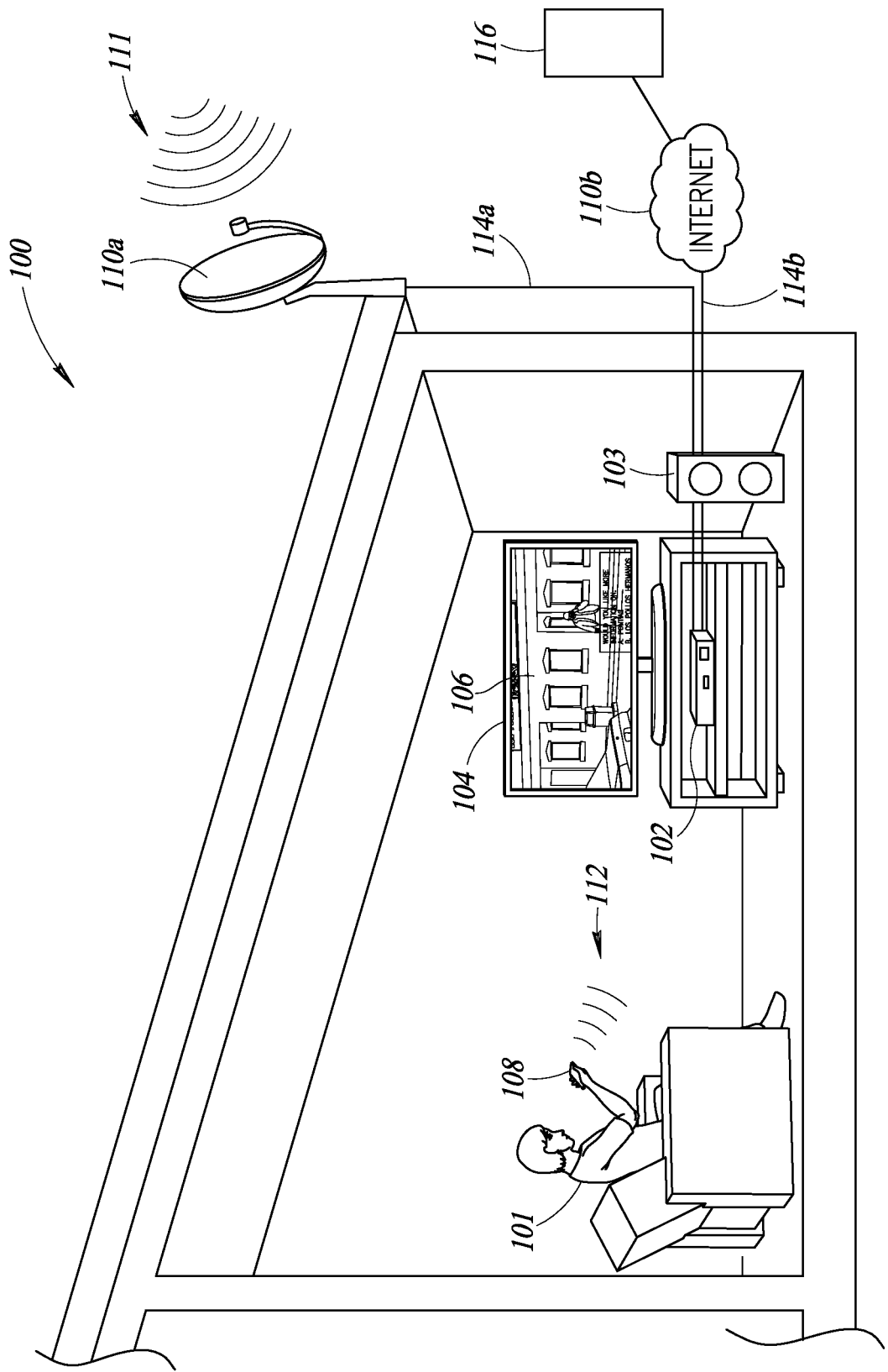
FIG. 1A shows the smart search system according to one embodiment.

FIG. 1 illustrates a system 100 for enabling a user 101 to search for additional information about a subject of an audio/video program. The audio/video program is provided as signal 111 to set top box 102 via satellite dish as signal 114a, as signal 114b via Internet 110b, or as a signal from any other appropriate source. The video component of the audio/video program is displayed on display 104. The audio component of the audio/video program is played by speaker 103. As user 101 watches audio/video program 106, they may desire to learn more about a particular subject featured in the audio/video program. For example, user 101 may wish to be reminded of an on-screen character's name or backstory. Similarly, user 101 may wish to learn more about real-world actors, locations, items, etc., featured in the audio/video program.

The set top box 102 contains a processor that controls the presentation of the audio/video program and a memory that stores data related to the audio/video program being output by the set top box 102. The memory in the set top box can be store a first database that contains significant information about the program being output, including the background, actors, buildings, cars, trucks, trains and other items in the program. The construction of, including the circuits, processors, memories and other details of set top boxes are well known in the art and need not be further described since they are widely published.

When user 101 desires additional information about the audio/video program, they use control device 108 to send a command 112 to set top box 102. Set-top box 102 determines a subject of the audio/video program associated with command 112. It then conducts a search for information regarding the subject and receives information regarding the subject from the search. Set-top box 102 then selects search results relevant to user 101 based on command 112 and the identity of the user. Set-top box 102 then conveys the search results to user 101.

Figure 2:
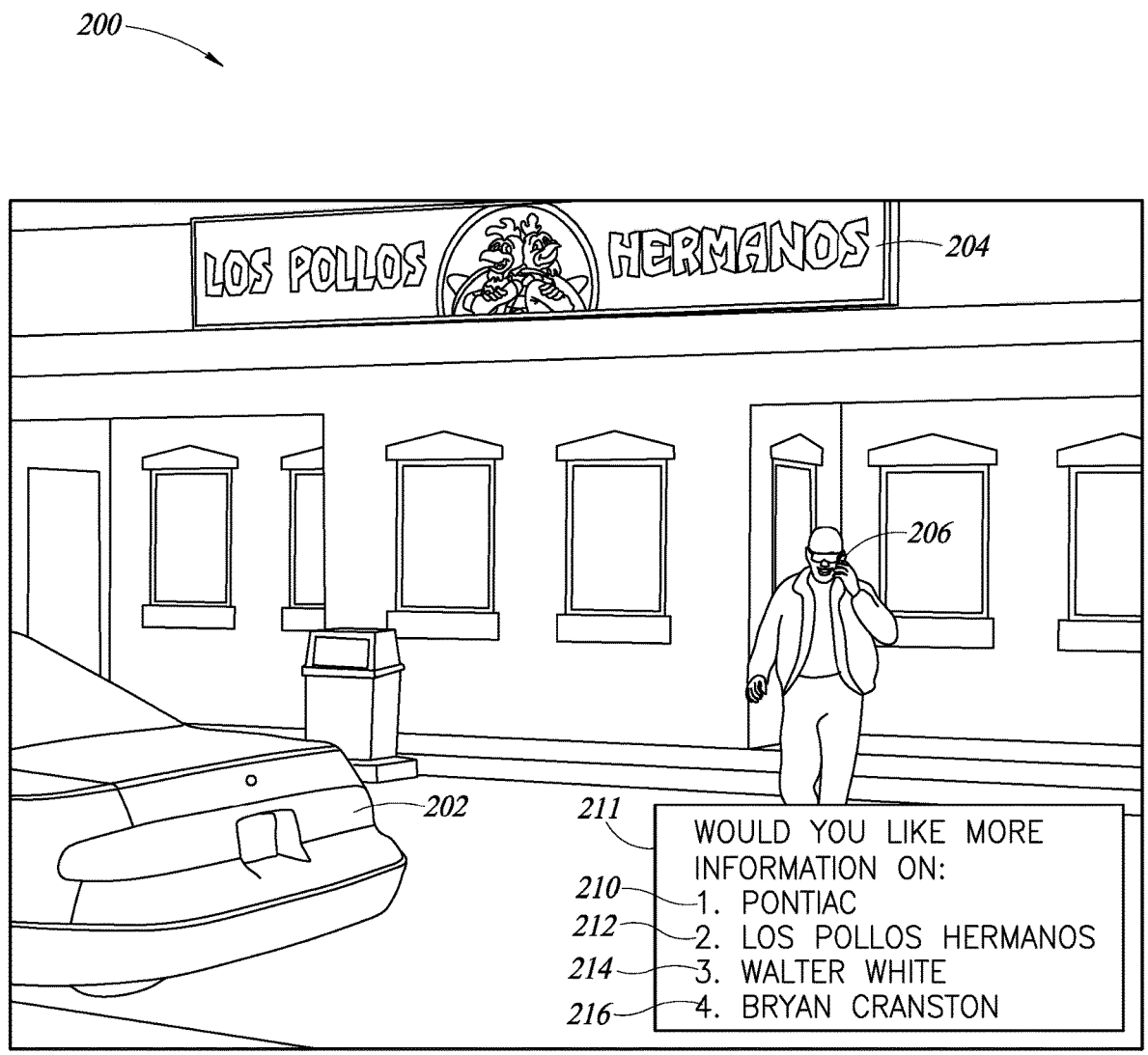
FIG. 2 shows a menu of the smart search system enabling input by a user in use according to one embodiment.
Figure 3:
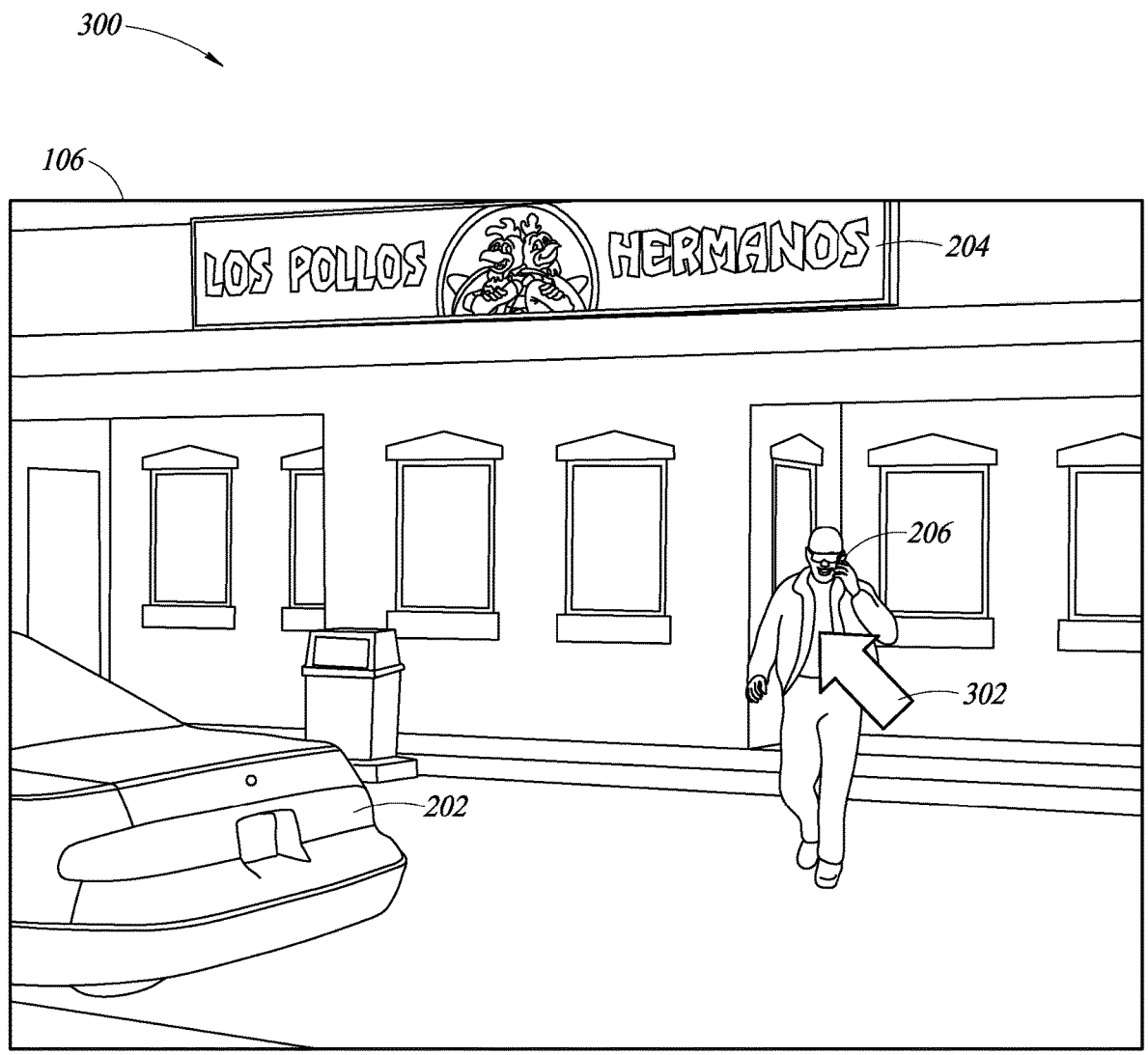
FIG. 3 shows an on-screen cursor of the smart search system wherein a user selects a subject using a cursor according to one embodiment.

Control device 108 may be a remote control or a smart phone, tablet, smart watch, or other personal computing device. Control device 108 enables user 101 to send a variety of commands to set-top box 102. In one embodiment, control device 108 itself displays a menu providing different methods of providing commands to set-top box 102. Alternatively, a menu providing different methods of providing commands to set-top box 102 is displayed over audio/video program 106. In one embodiment, the control device may be used to control a cursor that appears overlaid on display audio/video program 106, as depicted in FIG. 3. In another embodiment, the control device is used to open a menu and select an option from the menu, as depicted in FIG. 2.

Command 112 may be conveyed from control device 108 to set-top box 102 using near-field communication ("NFC"), Bluetooth, infrared communication, Wi-Fi, local area network ("LAN") or any other suitable communication protocol.

Upon receiving command 112 from control device 108, set-top box 102 determines a subject of the audio/video program corresponding to the command. In some embodiments, user 101 selects a subject of the audio/video program using a cursor interface, discussed in detail with respect to FIG. 3. After the cursor interface is positioned and command 112 is sent, set-top box 102 records the position of the cursor interface relative to frame 106. Using the position of the cursor interface, set-top box 102 can perform image analysis to separate the subject corresponding to the position of the cursor from other subjects in the audio/video program. In some instances, it is not practical to separate the desired subject from other subjects in the audio/video program using a particular command method. If user 101 wishes to search for information regarding the location a film was shot, simply selecting an item in the background of the audio/video program may be insufficient to accurately determine that the user wishes to search for an entire location as opposed to a single object that appears within the location. For example, a user selecting a building in New Mexico appearing in the audio/video program may wish to learn about the building itself or New Mexico generally. Alternatively, a user selecting a character appearing on screen may wish to learn more about the on-screen character or the real-life actor playing that character.

According to some embodiments, then, set-top box 102 provides a menu interface listing potential subjects, allowing user 101 to disambiguate the subject they desire to select from other potential subjects. In some instances, set-top box 102 attempts to identify each subject in audio/video program frame 106 as soon as the user indicates they would like to perform a smart search. Then, set-top box 102 can compile a list of candidate subjects for search. This process is described in detail with respect to FIG. 2.

In some embodiments, set-top box 102 sends information to remote server 116 identifying the audio/video program being smart searched and the frame at which user 101 initiated the smart search. Remote server 116 may then compare the command and the time of the command in the movie to previous commands given by other users in the past. If there is a similar command given at a similar time in the same audio/video program, it is possible that the subject user 101 wishes to smart search was previously searched by other users. This process is described in detail with respect to FIG. 2.

Figure 1B:
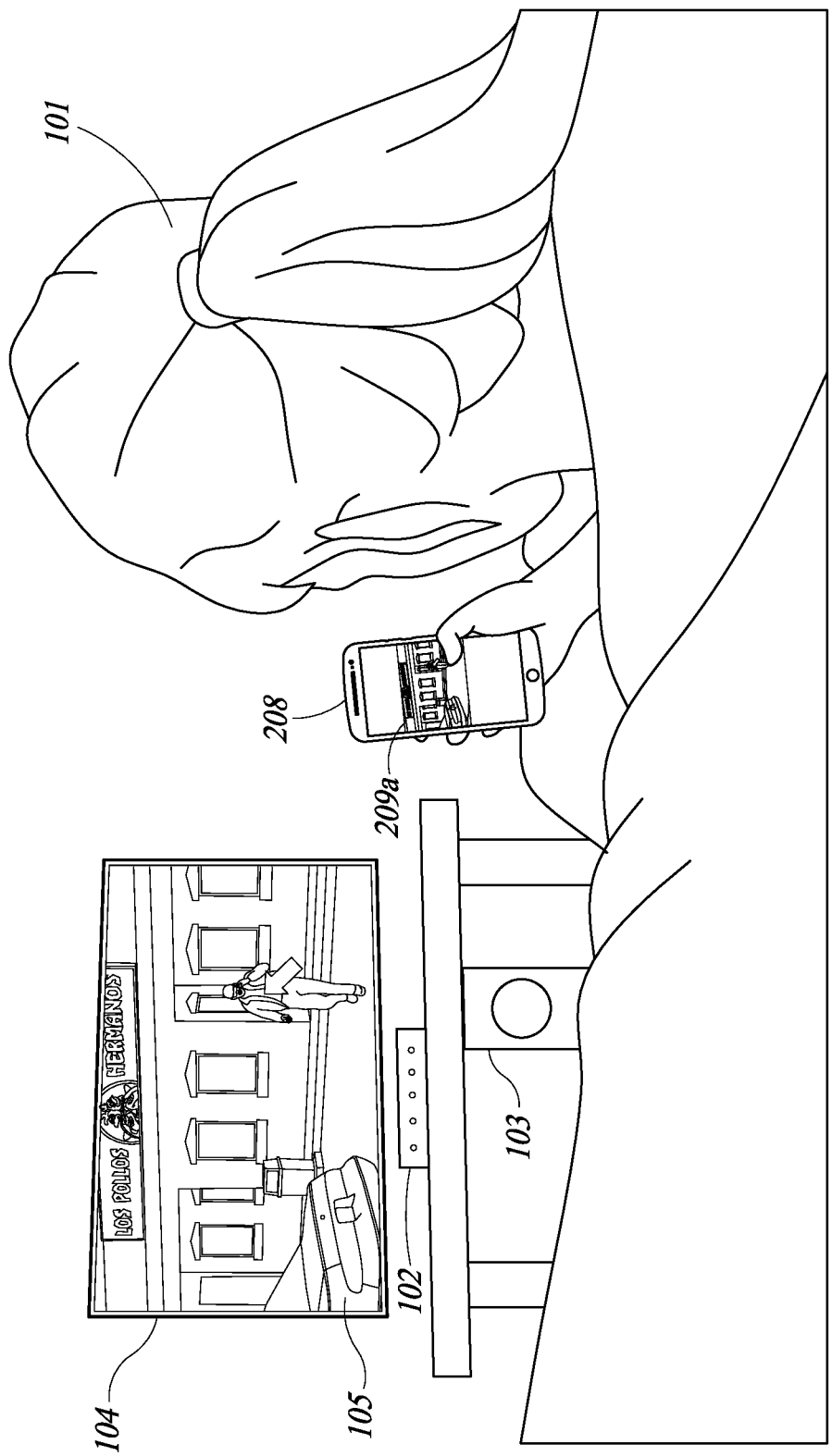
FIG. 1B shows a user using the smart search system while watching an audio/video program according to one embodiment.

FIG. 1B illustrates another embodiment of a system for enabling a user to search for additional information about subjects of an audio/video program. In the instances depicted in FIG. 1B, control device 208 is a personal device with a screen such as a smart phone, smart watch, computer, or the like. Control device 208 may in these instances communicate with set-top box 102 using Bluetooth, Wi-Fi, or any other known communication protocol.

Control device 208 uses an application, web portal, or other known interface enabling user 101 to establish a line of communication with set-top box 102. The line of communication may be automatically initiated when set-top box 102 detects previously used control device 208, or when user 101 opens the interface on control device 208 used to provide input to set-top box 102. Once a line of communication is established between control device 208 and set-top box 102, user 101 may initiate a smart search as desired.

Figure 5A:
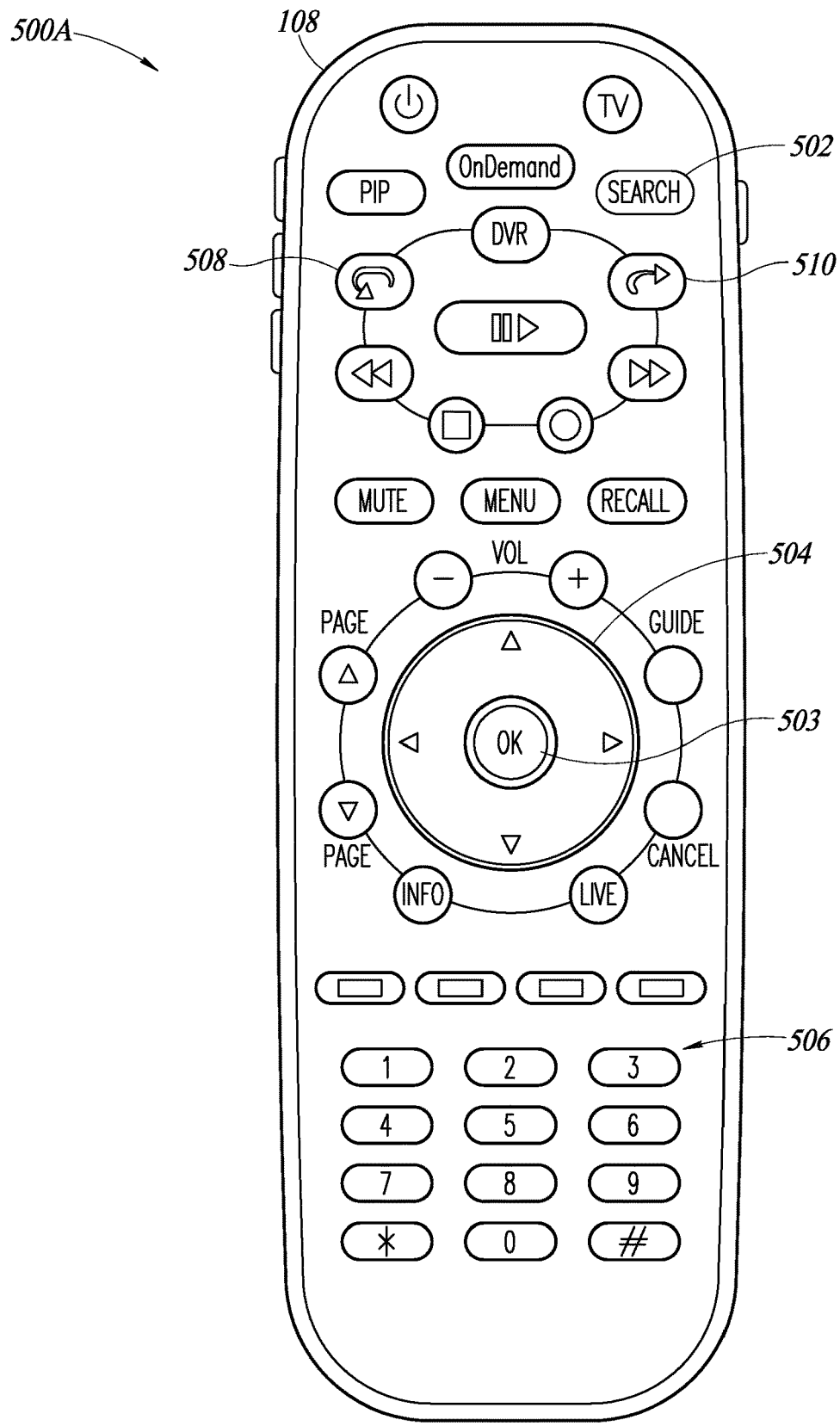
FIG. 5A shows a control device whereby a user provides input to the smart search system according to one embodiment.

To initiate a smart search, the user may, according to some embodiments, actuate a dedicated button as seen in FIG. 5A as search button 502. In some instances, there may not be a button dedicated to initiating a smart search and a certain combination of buttons are simultaneously actuated to initiate a smart search. The button or buttons may also, in some embodiments, be displayed as a virtual button in a user interface on a touchscreen of control device 208. In some embodiments, control device 208 uses an internal microphone to monitor user 101's speech for a particular phrase to trigger smart search.

In some embodiments, when a smart search is initiated, set-top box 102 pauses the audio/video program on frame 106 and awaits user input via control device 208. Set-top box 102 may query control device 208 to determine the mode of input user 101 intends to use to provide commands. In some instances, set-top box 102 saves a mode of input associated with control device 208, or control device 208 communicates the mode of input concurrently with the initiation of smart search. Examples of modes of input include a menu with selectable options as depicted in FIG. 2, a cursor displayed over frame 106 on display 104 is depicted in FIG. 3, use of an integrated touchscreen on control device 208, voice control using an integrated microphone on control device 208, or the like.

In some instances, control device 208 can accept multiple modes of input from user 101. In these cases, control device 208 may monitor input provided by user 101 across a plurality of sensors to determine the mode of input user 101 desires to use. For instance, if control device 208 is a smart phone, it may be capable of accepting cursor input as described with respect to FIG. 3 enabled by accelerometers, gyroscopes, and the like. It may also be capable of accepting voice input via an integrated microphone or touch input via integrated touchscreen 209*a*. Control device 208 must therefore monitor the plurality of sensors associated with modes of input for indications that user 101 is attempting to provide input via a method associated with that sensor. For example, if user 101 is attempting to use control device 208 to control an on-screen cursor, they may point control device 208 at display 104 or set-top box 102 and wait for an on-screen cursor to appear. If control device 208 detects this behavior, it can communicate to set-top box 102 that user 101 will use the cursor method of input and overlay a movable cursor over frame 106, for instance. If user 101 desires to use a touchscreen 209*a* on control device 208 to select a subject of interest, they may tap on touchscreen 209*a* in a location on the touchscreen corresponding to the position of the subject of interest on frame 106. Alternatively, user 101 may begin speaking if they desire to use voice input to identify the subject of interest.

In some embodiments, modes of input are associated with dedicated buttons or button combinations, physical or virtual, on control device 208. For example, control device 208 may have one button to initiate a smart search using voice input, another button to initiate a smart search using an on-screen cursor, and another button to initiate a smart search using touchscreen input.

In other instances, different modes of input are associated with different interactions with the same dedicated search button, depicted as element 502 in FIG. 5A. For instance, a sustained press of button 502 may indicate that user 101 desires to use a cursor input, while one rapid press of button 502 indicates that menu input is desired, or two rapid presses of button 502 indicates that voice input is desired.

Once the mode of input and associated command are determined, set-top box 102 begins performing image processing as described with respect to FIG. 2 and FIG. 3. As user 101 continues to provide input to set-top box 102 via control device 108 throughout the smart search process, they may wish to change input method. The process for determining an input method described above, then, may be continued after initial input is provided. In this way, set-top box 102 may determine which input method is desired for each interaction with user 101. For example, user 101 may initiate a smart search using a voice command, but prefer to specify a subject of interest using touchscreen 209*a* on control device 208. By continuously monitoring relevant sensors of control device 208, control device 208 or set-top box 102 can determine the preferred method of input for any interaction with user 101.

FIG. 2 illustrates an embodiment of a selection method 200 using on-screen menu interface 211 to enable user 101 to selectively search for additional information about a subject of an audio/video program. FIG. 2 will be described in terms of elements in FIG. 1A. The user 101 can make a first selection of a particular scene. This can be done by pausing on the scene, clicking mouse on the scene of other selection method. Once a scene is selected, the user 101 is presented with a menu interface 211 that displays a plurality of additional information or different subjects of the audio/video program identified by set-top box 102. For example, the scene may show a building, a car, a particular actor or a person the actor is playing. The menu can present a plurality of additional information to be further searched if the user desires. The menu 211 can be produced searching a database that is stored solely in the memory of the set top box, more details of which are described elsewhere herein.

Menu interface 211 can also be used to disambiguate subjects and yet additional of the audio/video program that are selected using a cursor or similar method, as described later with respect to FIG. 3. For instance, if user 101 selects actor 206 with a cursor interface, it is possible the user 101 desires more information about the on-screen character or the real-life actor. To provide an option for each situation, menu interface 211 can display the names of both the on-screen character 214 and the real-life actor 216 associated with actor 206, allowing for user 101 to disambiguate their subject selection.

Because menu interface 211 lists a plurality of subjects of the audio/video program, set-top box 102 must identify the plurality of subjects of the audio/video program before presenting menu interface 211 to user 101. In some embodiments, set-top box 102 itself performs image recognition on the frame of the audio/video program corresponding to the time when user 101 initiated a smart search. In other embodiments, set-top box 102 queries remote server 116 with frame 106, and the remote server performs image recognition on frame 106 and returns a list of subjects. The image recognition process according to some embodiments is described in detail with respect to FIG. 6.

Subjects of interest featured only in an audio component of the audio/video program cannot be identified using the image processing and image recognition techniques described herein. Instead, smart searches must use audio processing techniques adapted to identify a subject of interest appearing in audio. In some cases, such as when a user desires the name of a song played during an audio/video program, smart search may directly search a database of songs or sounds using a portion or portions of audio recently played. As when identifying subjects of interest with different visual prominence in frame 106, there may be a plurality of sounds recently played with different aural prominence. For example, if recent audio of the audio/video program is primarily conversation, but music is also playing in the background, audio processing may be performed to separate the conversation and the music. This allows for searches to be performed more accurately, as the signals from each subject interfere less with each other.

In some embodiments, a subject of interest in an audio portion of an audio/video program is identified by converting the audio portion to text using known audio processing and natural language processing techniques. For instance, if actor 206 recently spoke the phrases "Pontiac," "Los Pollos Hermanos," "Walter White," and "Bryan Cranston" in the audio/video program, those phrases may be converted to text and appear as vehicle name 210, restaurant name 212, character name 214, actor name 216, respectively, on menu interface 211 if user 101 indicates the subject of interest is a recently spoken phrase.

Set-top box 102 may also identify subjects by comparing command 112 to previously performed commands and their corresponding identified subjects. For example, if a user initiates a search for information about an on-screen actress at a certain time in an audio/video program, other users may also desire similar information. Set-top box 102 can create an embedding based on the audio/video program and the command. The embedding may include information sufficient to identify a frame 106 in an audio/video program where a smart search was initiated and a command or commands 112 provided during the smart search. The embedding is in some embodiments associated with additional information as the smart search is performed. This additional information may include a list of subjects associated with frame 106 and command 112, a subject selected, and search results about the subject. This type of smart search can be carried on and obtained from the active audio/video program being displayed rather than being stored memory of the set top box. Alternately, information regarding the audio/video program can be stored in the memory of the set top box.

The embedding may be created using machine learning techniques, or any other known and suitable data compression or encoding technique. Set-top box 102 can then compare the embedding to historical embeddings created from users' previous smart searches. The historical embeddings are associated with the subjects of interest a user ultimately performed a smart search for information about. By comparing the embeddings, set-top box 102 can predict which subject of the audio/video program user 101 is likely to desire information about. For example, when user 101 initiates a smart search with command 112 at frame 106, set-top box 102 searches for historical embeddings matching these features. Because the historical embeddings may be associated with information about the list of subjects, the selected subjects, and the search results, comparing the embedding to historical embeddings allows set-top box 102 to determine information user 101 is likely to desire. The historical embeddings may be stored in set-top box 102, remote server 116, or any other suitable device in contact with set-top box 102 through internet 110*b*, satellite 110*a*, or any other means.

Depending upon the method of embedding used, the comparison of the embeddings may be done using machine learning techniques, or by searching a database of smart searches for smart searches performed at the same time as a currently initiated smart search. For example, if user 101 initiates a smart search at frame 106 in an audio/video program, set-top box 102 can search a database for smart searches made by other users at or around frame 106 in the same audio/video program. If previous smart searches were made around frame 106, set-top box 102 can retrieve the subjects searched for at that time, and display them in menu interface 211. By retrieving search subjects from previous smart searches made by other users, set-top box 102 can reduce the amount of image processing necessary during potentially repetitive smart searches and lower the number of actions user 101 must take to identify subject in frame 106 by predicting the subject they wish to select.

In addition to using historical embeddings to assist in identifying subjects for smart searches, recorded information may be optionally displayed where available during playback of an audio/video program. For example, one member of a family may initiate a smart search at frame 106. During the smart search, the family member must identify a subject they desire more information about, for instance, vehicle 202. The smart search performed about vehicle 202 may have yielded information about the vehicle's make, model, and other characteristics. Set-top box 102 can save the search results and associate them with frame 106. This creates a customized annotation of the audio/video program unique to the family member.

Figure 4:
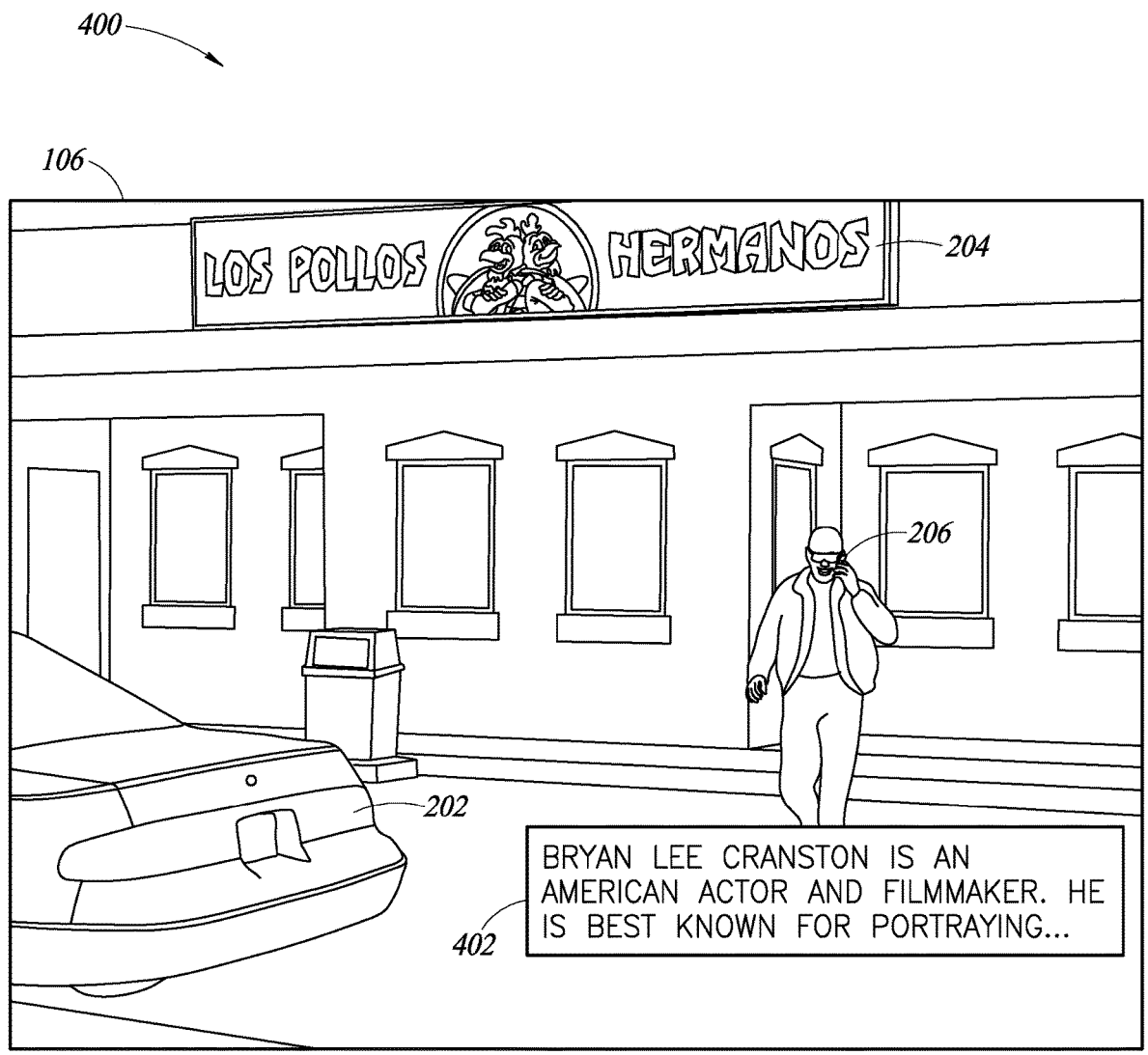
FIG. 4 shows a screenshot of the smart search system wherein search results are conveyed to the user according to one embodiment.

Other users may desire to view this customized annotation while watching the audio/video program themselves. Continuing the above example, a different user playing back the same audio/video program later with annotations on would, at frame 106, be presented with information about vehicle 202 without having to perform a new smart search. This enables users watching the same audio/video program at different times to see what previous set-top box 102 users were interested in and what information they found as annotations as seen in FIG. 4.

In other embodiments, historical embeddings are crowd-sourced from a plurality of user's smart searches across a potentially large number of set-top boxes and displayed during playback. This is facilitated by set-top box 102 sending information to remote server 116, and later querying remote server 116 for information received from other set-top boxes. If a plurality of users performed similar smart searches, the information from the smart searches may clarify a confusing plot point, identify a beautiful film location, translate important on-screen text, or perform other viewing-enhancing services. If many users request a translation of on-screen text, user 101 may also desire the translation, which may be automatically retrieved from a database and provided as an annotation at the appropriate time in the audio/video program.

In some instances, user 101 selects a degree of annotation derived from smart searches they desire to view during playback of an audio/video program. If user 101 is watching a historical documentary, for instance, they may be interested in learning more about many of the subjects appearing in the documentary and select a high degree of annotation derived from smart searches performed by other viewers. If user 101 is watching a romance or drama, however, they may select a lower degree of annotation. A low degree of annotation may only display information smart searched by a relatively large number of users, while a high degree of annotation may display smart search information derived from smart searches performed by relatively few users.

A second search can be conducted of the additional information. This second search in one embodiment is conducted solely in the database stored in the memory of the set top box. In a second embodiment, it is conducted in databases that are accessible via an external network, for example, databases stored in the cloud, the internet and/or the world wide web.

In some embodiments, subjects of interest are automatically identified instead of being identified through user smart searches, and annotations with information regarding the subjects. These automatically identified annotations may be created using the image processing techniques described above, or by any other known technique.

FIG. 3 illustrates a subject selection method 300, with cursor interface 302 enabling user 101 to selectively search for additional information about a subject of audio/video program. It will be described in terms of elements seen in FIG. 1. Using control device 108, user 101 may use a cursor to select a subject of audio/video program frame 106. In some embodiments, initiating a smart search pauses the audio/video program and overlays a selectively movable cursor 302 over the displayed frame 106. User 101 then uses cursor interface 302 to select a subject using control device 208. In some embodiments, interaction with cursor interface 302 is facilitated by a device orientation sensor such as an accelerometer, a gyroscope, a linear acceleration sensor, or the like present in control device 208.

In some embodiments, interaction with cursor interface 302 is facilitated using a plurality of buttons on control device 208, as depicted in FIG. 5A selection member 504, or any other known and suitable button configuration.

In some embodiments wherein control device 208 features a touchscreen, as depicted as 209a in FIG. 1B, set-top box 102 can push a copy of frame 106 to control device 208 for display on the touchscreen. Then, user 101 can tap the area of the touchscreen corresponding to the subject of interest in frame 106 to designate the subject of interest. Control device 208 then conveys the position of the touchscreen tapped to set-top box 102 to continue the smart search.

While user 101 designating a subject of interest with cursor interface 302 may reduce the area that must be searched to identify subjects of interest as described with respect to FIG. 2 above, it may not always eliminate the need to use image processing techniques to determine the subject of interest. For example, in FIG. 3, cursor interface 302 is centered on actor 206's shirt. While the user may be intending to select actor 206, performing image recognition in a small area around cursor interface 302 does not necessarily capture features necessary to identify character 206 using image recognition technology, such as actor 206's face. Therefore, edge detection or other known object detection techniques centered around the position of cursor interface 302 may be necessary to correctly capture the intended subject of interest.

Even using image processing techniques to identify the subject of interest, ambiguity may remain. While user 101 may desire information about actor 206 generally, positioning cursor interface 302 on actor 206's shirt could indicate that the user desires information about actor 206's shirt, their jacket, the actor himself, the on-screen character itself, and so on. Where a plurality of subjects are identified, a menu interface as described with respect to FIG. 2 above can be used to disambiguate the subject of interest by prompting user 101 to select the subject of interest from the plurality of subjects.

FIG. 4 illustrates one embodiment 400 of a method of conveying search results to a user and is described in terms of elements depicted in FIG. 1. After receiving commands 112 sufficient to identify a subject of interest in the audio/video program, set-top box 102 searches a database for information about the subject. Upon receiving information from the database, set-top box 102 selects results to convey to user 101. The selected results are then conveyed to the user, in the present instance using results interface 402. In some embodiments, user 101 may interact with results interface 402 using control device 108 to view additional search results.

The database searched by set-top box 102 for additional information about the subject of interest may exist in a local memory of set-top box 102. In some embodiments, the database is a text-based search engine; in other embodiments, the database is an image-based search engine. In some embodiments, the database is remote and set-top box 102 queries it for information via internet 110b or any other suitable communication system.

The search is, in some embodiments, performed using information based on input from user 101 via control device 108 alone. In some instances, however, user input is supplemented with user data stored in a set-top box 102 or on remote server 116. For example, user 101 may have previously smart searched for information about an actor and then immediately performed a smart search for the actor's height, indicating they may find this feature interesting. When the user later performs a new smart search for information about a new actor, set-top box 102 automatically modifies the subject of interest or selects search results to display information about the new actor's height. Alternatively, user data unrelated to the smart search or the subject of interest may be used to modify the smart search for smart search results displayed in results interface 402.

In some embodiments, search results are selected for display in results interface 402 based on a demographic of user 101. For example, if user data indicates user 101 is interested in purchasing a coffeemaker, an advertisement for a coffeemaker may be conveyed to user 101 in addition to the smart search results.

In an embodiment depicted in FIG. 4, the subject of interest is actor 206 and a portion of the smart search results can be legibly displayed in results interface 402. According to some embodiments, set-top box 102 conveys the smart search results via speaker 103 seen in FIG. 1. In other embodiments, set-top box 102 conveys the smart search results to user 101 via control device 108 via an integrated speaker. If control device 108 features a screen, the smart search results may also be conveyed via displayed on the screen of control device 108, enabling user 101 to selectively watch the audio/video program on display 104

In some embodiments, user 101 may interact with results interface 402 to view more of the search results. For example, user 101 may scroll through results text displayed in results interface 402 using control device 108.

FIG. 5A illustrates a control device according to an embodiment 500a of the present disclosure. It will be described using elements depicted in FIG. 1A. Control device 108 is, in some embodiments, specifically adapted to communicate with set-top box 102. Some users may prefer to use a specifically adapted controller 108 instead of a smartphone or other personal electronic device to communicate with set-top box 102. For example, search button 502 initiates a smart search when pressed. In some instances, the user may select the mode of input they desire to use by interacting differently with search button 502, as described with respect to FIG. 1B. Control device 108 may also include a plurality of other physical buttons configured to facilitate user input to set-top box 102. Back button 508 and forward button 510, for example, allow the user to move backward or forward in the audio/video program. This may be beneficial in performing smart searches. For instance, a user may be interested in a subject that appears on screen for only a brief period of time, such as a car that drives by in a scene. Back button 508 allows the user to rewatch the previous portion of the audio/video program and initiate smart search using search button 502 when the subject again appears on-screen. OK button 503 may be used to confirm a selection, indicate a user is finished providing input, or the like.

According to some embodiments, selection member 504 allows for a user to move an on-screen cursor. For example, depressing the side of selection member 504 above OK button 503 may communicate with set-top box 102 to continuously move the on-screen cursor towards the top of the screen. In this case, it may be intuitive for the user to press OK button 503 confirming they are finished moving the cursor, as opposed to interacting again with search button 502, for instance. Numerical buttons 506 may also be used to interact with smart search. For example, when interacting with a menu interface as shown as element 211 in FIG. 2, a user may prefer to select the first option in the menu interface 211 by pressing numerical button "1," the second option by pressing numerical button "2," and so on.

According to some embodiments, a user may wish to configure a button on control device 108 to communicate a particular command or set of commands 112 to set-top box 102. For example, after performing a smart search, set-top box 102 may allow the user to associate that smart search with a button or combination of buttons. If the user selects a button or combination of buttons, they can then use that selection as a shortcut to perform the same command 112 again. If a user frequently wishes to identify an on-screen actor, for instance, they may choose to associate one of numerical buttons 506 with a search for the identity of an actor appearing on-screen.

The input features and characteristics described above with respect to a controller specifically adapted to interact with a set-top box may also be implemented through software to configure a personal electronic device to interact with the set-top box. For instance, selection member 504 may be re-created with an icon on a touch screen, enabling a user to move an on-screen cursor as described above in substantially the same way on their personal electronic device as on control device 108.

Figure 5B:
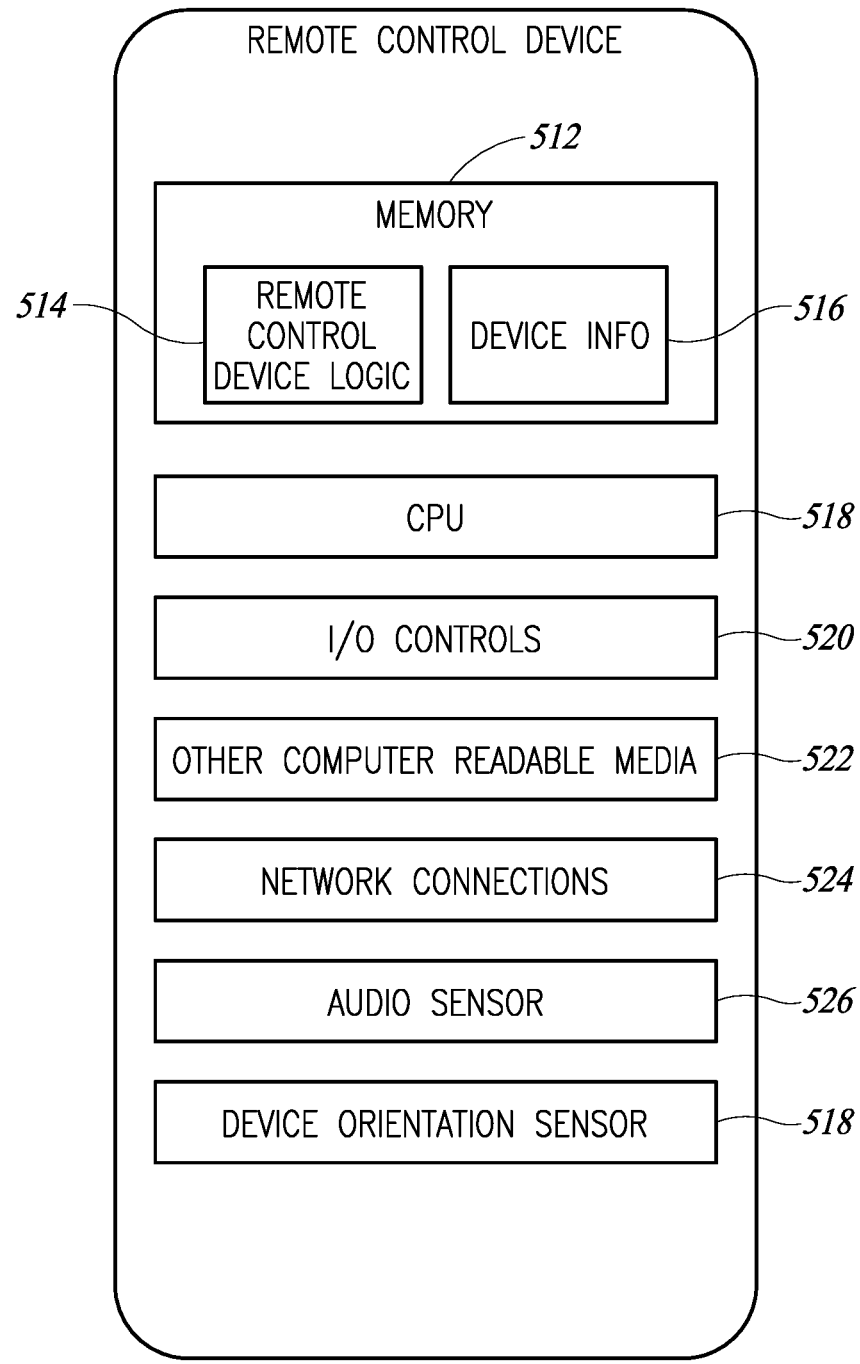
FIG. 5B shows a selection of components of a control device according to one embodiment.

FIG. 5B show the selection of components of the control device according to an embodiment 500b of the present disclosure. It will be described with respect to elements depicted in FIG. 1A. Control device 108 includes memory 512, which contains remote control device logic 514 and device info 516. CPU 518 facilitates interaction between a plurality of sensors, I/O controls, and memory of control device 108. I/O controls 520 facilitate input by a user through a plurality of buttons, switches, selection members, sensors, and the like, of control device 108. Other computer readable media 522 may store additional information pertaining to the use of control device 108 with respect to smart search, such as user-defined button assignments. Network connections 524 may include hardware configured to establish a line of communication with a set-top box or other device using Bluetooth, infrared, Wi-Fi, local area network ("LAN") or any other suitable communication protocol. Device orientation sensor 528 allows the user to provide input by moving control device 208 in physical space.

Memory 512, according to some embodiments, may store additional information such as user data. For example, control device 108 may collect user data for use in connection to a smart search while a set-top box is off. Then, when set-top box 102 is turned on and control device 208 establishes a connection with set-top box 102 using network connections 524 or otherwise, control device 108 may transmit the user data stored in memory 512 to set-top box 102. In some embodiments, information related to the audio/video program being output by the set top box can be transferred to and stored in the memory 512 of the control device 108. In one embodiment, the memory 512 may therefore contain a first database that has stored therein information about the video program being presented on the set top box.

Remote control device logic 514 contains configuration information about control device 108. Remote control device logic 514 may be updated by direct communication with a remote server through network connections 524, or by communication with set-top box 102. In some instances, users may configure remote control device logic 514 to customize performance of control device 108. Device info 516 contains information relating to the identity of control device 108. Device info 516 may, in some instances, be used by set-top box 102 to verify the identity of control device 108, such that similar but different control devices may not be used to communicate with set-top box 102.

CPU 518 may, in some instances, be used to perform aspects of smart search instead of set-top box 102. For example, interpretation of user commands may be performed to various degrees by CPU 518 or set-top box 102. In some embodiments, control device 108 sends raw user input corresponding to button presses and the like to set-top box 102 for interpretation into a subject of interest appearing on display 104, for example. In other embodiments, control device 108 may interpret raw user input into a subject of interest using CPU 518, and send set-top box 102 the subject of interest the user desires to search for more information about. In some embodiments, the search itself may be performed using CPU 518 through network connections 524 or memory 512. Furthermore, the search results may be conveyed to user 101 using a function of control device 108 like a touchscreen or speaker, as available.

Device orientation sensor 528 may be an accelerometer, gyroscope, linear acceleration sensor, or the like. According to some embodiments, device orientation sensor 528 is used to facilitate control of an on-screen interface, as depicted as cursor interface 302 in FIG. 3. In some instances, user 101 may use device orientation sensor 528 to modify input provided by other means. For example, a user initiating a smart search may rotate control device 108 to the left to rewind from the present frame and navigate to an earlier frame in an audio/video program. User 101 may, in some instances, cancel a smart search by shaking or putting down control device 108 or initiate a smart search by picking up control device 108.

The selection of components illustrated in FIG. 5B may be present either in a control device specifically adapted to communicate with a set-top box, as shown in FIG. 5A, or in a personal electronic device like a cell phone, smartwatch, and the like. In personal electronic devices that lack one or more of the selected components, only a subset of commands not requiring that component may be enabled for use by the user.

Figure 6:
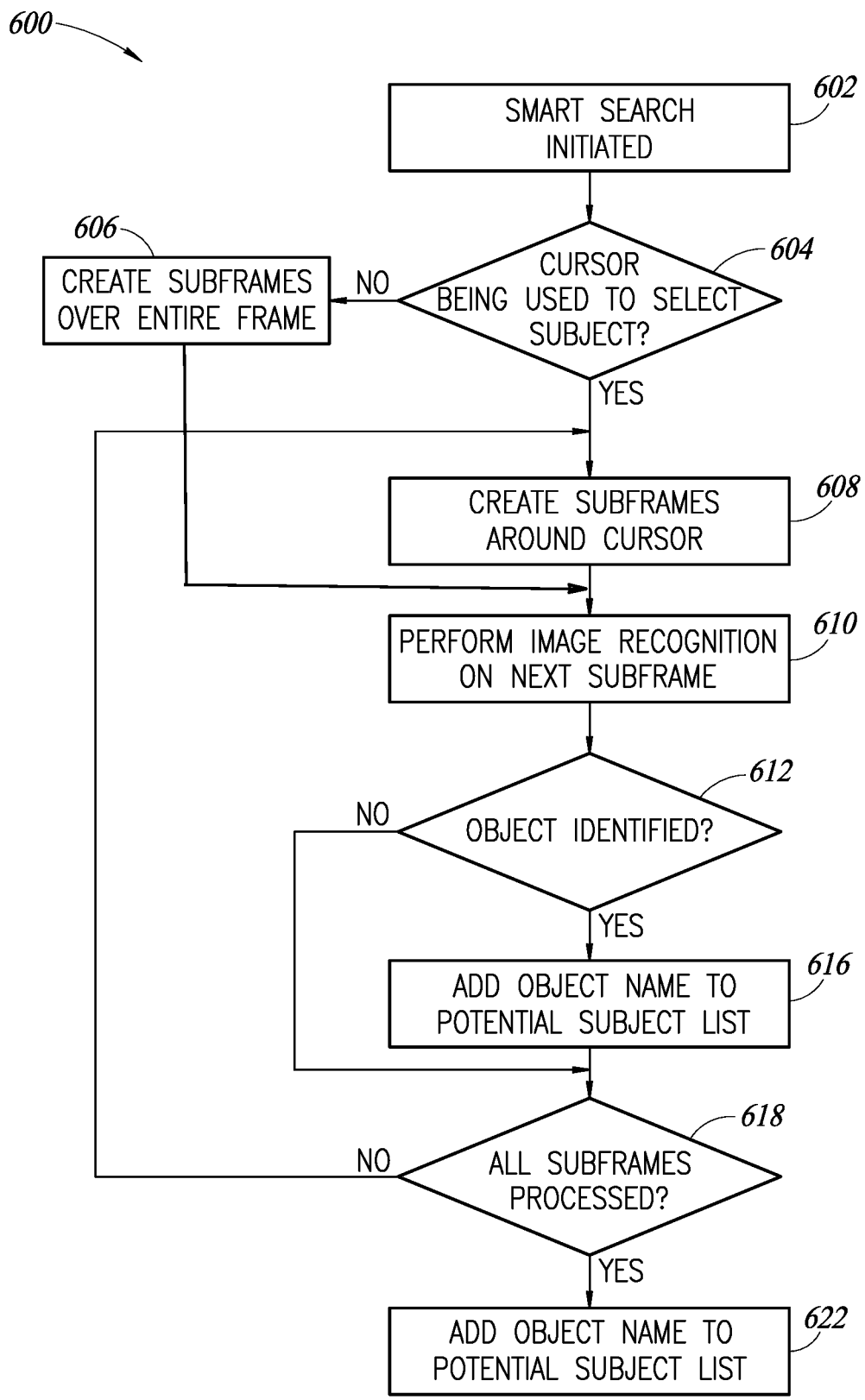
FIG. 6 is a logical flow diagram showing the process of identifying a subject of interest according to one embodiment.

FIG. 6 shows a logical flow diagram depicting the process of performing object detection in a frame 600 of an audio/video program 106, according to some embodiments. FIG. 6 is described with respect to elements depicted in FIG. 1 and FIG. 2. At 602, user 101 initiates a smart search. At 604, set-top box 102 or control device 108 determines whether the user wishes to use a cursor interface to select a subject of interest or if set-top box 102 should perform object detection on the entire frame 106. At 606, if user 101 is not using a cursor or similar method to provide input, the entire frame 106 is processed into subframes. If the user is using a cursor or similar method to provide input, an area around the cursor is processed into subframes at 608. At 610, image recognition is performed on the next subframe. At 612, if an object is identified in the subframe using image recognition, the name of the object is listed to a list of potential subjects. If an object is not identified in the subframe, the process continues at 614. At 618, set-top box 102 determines whether image recognition has been performed on each created subframe. If not, at 620 the process returns to 610 and another subframe is processed. If all of the subframes have been processed, the list of potential subjects is conveyed to user 101 so they can select their desired subject of interest.

At 604, set-top box determines whether user 101 is using a cursor or similar method to select a subject of interest in frame 106. Accepting user input before running image recognition on subframes of 106 may allow set-top box 102 to narrow its search to a smaller area on-screen, and limit the creation of subframes to the area selected, as at 608. But if user 101 wishes to be presented a list of potential subjects in frame 106 before providing any input, it may be necessary to create subframes over the entire frame 106, as at 606.

Image recognition is performed to identify subjects in frame 106 at 610. Image recognition may be performed using known image recognition algorithms or services. The output of image recognition is typically a phrase describing the image. For example, the output received by performing image recognition on entire frame 106 may be sufficient to identify a plurality of subjects with which to populate a list of potential subjects. But known image recognition techniques applied to entire frame 106 may produce a description of the scene in general as opposed to identifying a plurality of specific subjects. For example, the image recognition algorithm applied to frame 106 may produce an output such as "a man walking next to a car in a parking lot." While this description may describe frame 106 generally, the subjects identified-a man and a parking lot—may be too generic to perform the desired search for user 101. If user 101 desires more information about a particular on-screen vehicle 202 or restaurant 204, the subjects of the audio/video program must be identified in more particularity.

In some embodiments, then, it is beneficial to divide frame 106 into a set of sub-frames at 606 or 608. Then image recognition is performed on each sub-frame in the set of sub-frames at 610. If an object is identified, it is added to a potential list of subjects at 616, which conveyed to user 101 at 622 once each subframe is processed. In some embodiments, not all subframes are processed and the list of potential subjects is conveyed to user 101 after at least a configurable number of subjects are identified. Performing image recognition on subframes allows for subjects to be identified with more particularity, such as identifying the name of the on-screen character or actor 206, or the make and model of vehicle 202. The set of sub-frames may be produced by dividing frame 106 into a grid, by performing edge detection or other object detection techniques on frame 106, or using any other known image processing technique.

In some embodiments, a plurality of sets of subframes may be produced using different methods, and image recognition is performed on sub-frames in each set. Process 600 may therefore in some instances loop to 606 or 608 after processing all subframes at 618 instead of continuing to 622. Sub-frames in a set may or may not overlap or cover the entire frame 106. For example, an object detection algorithm may detect a plurality of distinct color areas around vehicle 202, restaurant 204, and actor 206 in portions of frame 106. In this case, image recognition may only be performed on portions of frame 106 corresponding to the distinct objects identified. But if a grid technique alone is used, image recognition may, in some instances, be performed at 610 on each portion of frame 106 irrespective of whether a distinct object appears in each subframe. Vehicle 202, restaurant 204, and actor 206 can be detected by analyzing the image recognition outputs for each sub-frame. In some embodiments, sets of sub-frames may be produced and processed with image recognition iteratively using different grid sizes, grid shapes, or object detection algorithms, allowing for subjects with various prominence in frame 106 to be accurately identified. For example, identifying a geographical location featured in frame 106 may require performing image recognition on the entire frame, while identifying an actor 206 may require performing image recognition on only a small sub-frame of frame 106 corresponding to the actor's face.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   outputting under control of a processor a video signal of program data configured to be presented to a display for viewing by a user;
   receiving, by the processor, a command from a control device;
   determining a timestamp of the program data that corresponds to when the command was received from the control device;
   obtaining previous searches by other users that correspond to the timestamp;
   identifying a subject of the program data at the timestamp based on the previous searches by the other users;
   conducting a first search in a first database of the identified subject;
   presenting, to the user, a plurality of additional information items about the identified subject obtained by the first search;
   receiving by the processor, a selection of an additional information item among the plurality of presented additional information items;
   conducting, using the selected additional information item, a second search in a second database;
   selecting results from the second search likely to be relevant to the user based on the identity of the user; and
   conveying the selected results to the user.

2. The method of claim 1, further including a set top box having a memory that has stored therein the first database, wherein the first search is performed solely of data stored in the memory of the set top box.

3. The method of claim 2 wherein the first database and second database are the same and the second search is performed solely using data stored in the memory of the set top box.

4. The method of claim 2 wherein the first database and the second database are different and the second search is performed on one or more databases via an network external to the set top box.

5. The method of claim 1 further including:
outputting under control of the processor an audio signal of program data that is associated with the video data and that is output to be heard by the user,
wherein the first search is conducted based on identified audio data.

6. The method of claim 1, wherein the additional information from the first search is presented by displaying a visual representation of the first search results by the display.

7. The method of claim 1, wherein the conveying is outputting an audio representation of the search results by the speaker.

8. The method of claim 1, wherein the audio component and the video component are synchronized on a same data stream.

9. The method of claim 1, wherein in response to the command the set top box pauses the audio/video program until the search results are conveyed to the user.

10. The method of claim 1, wherein program data having information about the search results and the command is saved in user data.

11. The method of claim 1, wherein program data having information about the search results is saved in the memory, and wherein while the same audio/video program is being subsequently displayed, a visual representation of the program data is output by the display.

12. A system, comprising:
a display configured to output a video component of an audio/video program;
a speaker configured to output an audio component of the audio/video program;
a set top box configured to output the video component to the display and the audio component to the speaker;
a control device configured for receiving input from a user, the control device configured to communicate with a set top box; and
a processor of the set top box configured to:
receive a command from the control device;
determine a timestamp of the program data that corresponds to when the command was received from the control device;
obtain previous searches by other users that correspond to the timestamp;
select a subject of an audio/video program at the timestamp based on the previous searches by the other users;
perform a search for information about the subject;
obtain search results about the subject based on the search; and
convey the search results to the user.

13. The system of claim 12, wherein the processor is further configured to send information about the command to a remote server.

14. The system of claim 12, wherein the processor is further configured to send information about the search results to a remote server.

15. The system of claim 12, wherein the subject is an audio component.

16. The system of claim 12, wherein the subject is a video component.

17. The system of claim 12, wherein the conveying is displaying a visual representation of the search results by the display.

18. The system of claim 12, wherein the conveying is outputting an audio representation of the search results by the speaker.

19. The system of claim 12, wherein the audio component and the video component are synchronized on a same data stream.

20. A set top box system, comprising:
a memory coupled to a processor;
a connection to a communication system; and
a processor configured to:
receive a command from a control device operated by a user while an audio/video program is being displayed to the user;
determine a timestamp of the audio/video program that corresponds to when the command was received;
compute an embedding based on the command and the audio/video program;
compare the embedding to a plurality of historical embeddings paired with historical subjects, wherein the historical embeddings are computed based on previous searches by other users that correspond to the timestamp;
select, based on the comparing, a plurality of historical subjects;
determine a candidate subject at the timestamp using the plurality of historical subjects;
perform a search for information about the candidate subject;
obtain search results based on the search; and
convey the search results to the user.

* * * * *